Aug. 28, 1956     R. E. SEGALL     2,760,788
DETACHABLE VEHICLE CRASH PAD FOR INSTANT PASSENGER USE
Filed April 9, 1954
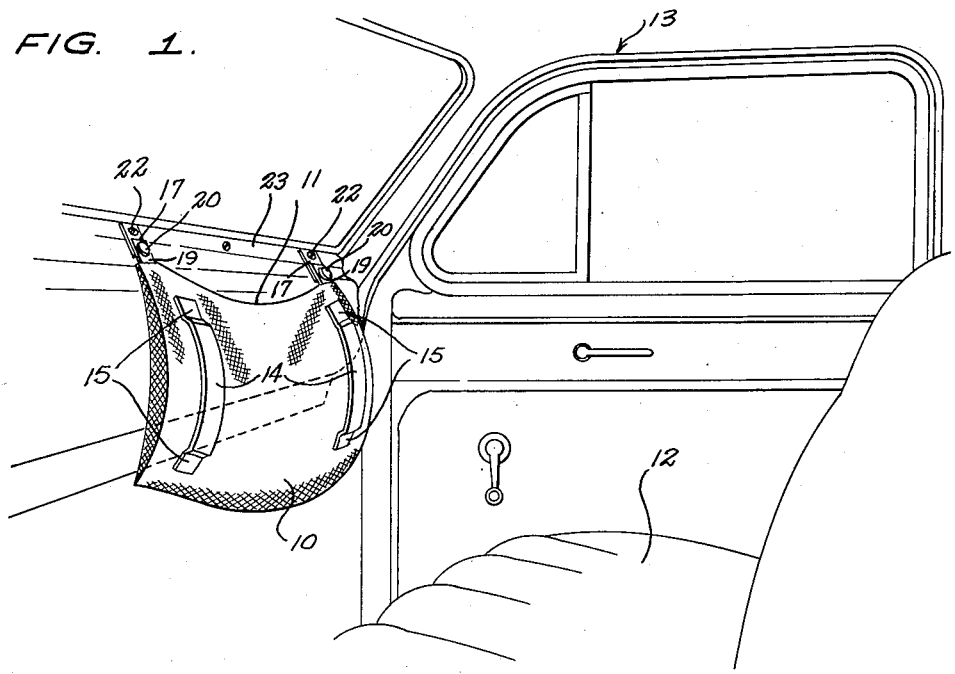
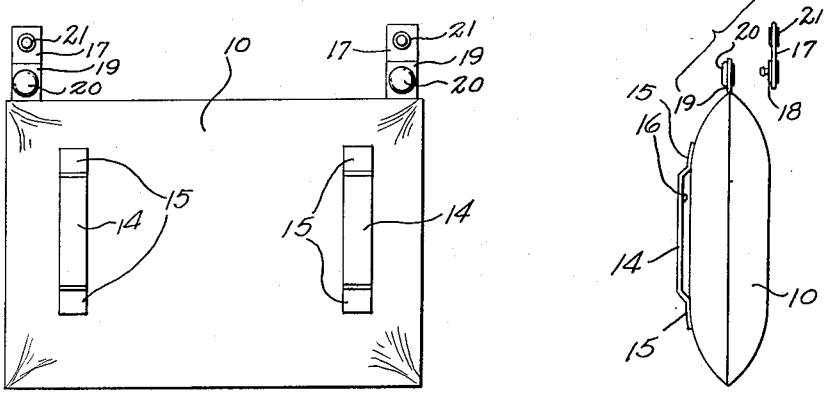
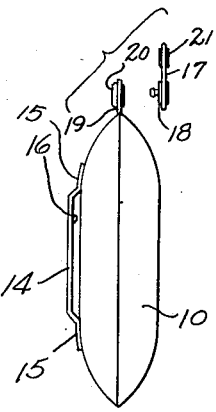
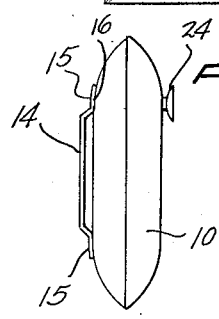
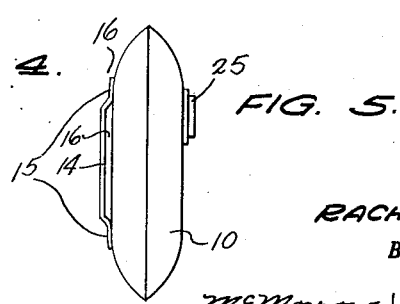
INVENTOR.
RACHEL E. SEGALL,
BY
McMorrow, Berman + Davidson
ATTORNEYS.

United States Patent Office 2,760,788
Patented Aug. 28, 1956

2,760,788

DETACHABLE VEHICLE CRASH PAD FOR INSTANT PASSENGER USE

Rachel E. Segall, Sidney, N. Y.

Application April 9, 1954, Serial No. 422,145

2 Claims. (Cl. 280—150)

This invention relates to an improved crash pad for use in a vehicle for protecting an occupant of a vehicle in the event of a crash.

An object of the invention is to provide a vehicle crash pad which is attached to the vehicle even when not in use and which is adapted to be seized and held in a protective position by an occupant of the vehicle in the event of an impending crash.

Another object of the invention is to provide a vehicle crash pad so arranged in the vehicle that instinctive movements of an occupant in the event of an impending crash will result in his obtaining the protection afforded by the pad.

A further object of the invention is to provide a vehicle crash pad of simple, inexpensive construction, which may be readily attached to and detached from the vehicle in which it is to be used.

Other objects and advantages of the invention will appear from the following description considered in conjunction with the attached drawing, in which:

Figure 1 is a perspective view of a crash pad of the present invention attached to the instrument panel of an automobile.

Figure 2 is a front elevational view of the pad of the present invention.

Figure 3 is an exploded end elevational view of the assembly of Figure 2 and the attaching means.

Figure 4 is an end elevational view of the pad of the present invention showing an alternative attaching means; and Figure 5 is an end elevational view of the pad of the present invention showing another alternative attaching means.

Referring now to the drawing in more detail, the illustrated device comprises a resilient rectangular pillow 10 adapted to be positioned in confronting, face-to-face relation with respect to an interior, upright, supporting surface of a vehicle in front of a seated occupant of such vehicle. The pillow 10 consists of a casing of tough, durable fabric, well filled with a substantial, resilient material. The pillow 10 is suspended in a substantially upright position with one of its faces against the vertical face of preferably a vehicle instrument panel 11 in a position in which it would be directly in front of a person seated in the right-hand front seat 12 of an automobile 13. The pad of the present invention may be used for the protection of occupants of other seats of the vehicle, however, and when employed for the benefit of an occupant of a back seat the pad is positioned in face-to-face relation with the rear surface of the back of the front seat of the vehicle.

A hand gripping means, consisting of a pair of upright hand straps arranged in parallel spaced relation, are connected only at their ends to the front face of the pillow 10. The straps 14 are stitched at their end portions 15 to the front of the pillow casing and are spaced far enough apart to permit the occupant of the seat to bury his head in the portion of the pillow between the straps 14. The stitched end portions 15 are so positioned as to provide a clearance 16 between the central portion of the straps 14 and the front face of the pillow 10 of sufficient size to enable the occupant of the vehicle seat to insert his fingers between the straps 14 and the front face of the pillow 10 in order to grip the pillow 10 firmly.

Attaching means are carried by the pillow 10 for detachably connecting it to the supporting surface 11 of the vehicle.

The attaching means consists of a tab 19 attached to the upper edge of the pillow 10 adjacent each end thereof and carrying a female element 20 of a snap fastener. A strip 17 is detachably connected to each tab 19 by means of a male element 18 of a snap fastener, on one end of the strip and engaging the female element 20. The other end of each strip 17 is provided with an eyelet reinforced aperture 21 through which a screw 22 is inserted and secured in a portion 23 of the windshield frame of the vehicle to hold the pillow 10 in a depending position against the instrument panel 11. As an alternative to the use of the eyelet 21 and the screw 22 the strip 17 may be permanently fastened to the dashboard 11 by a suitable adhesive.

Alternative attaching means may be employed, as for example, a vacuum cup 24, as shown in Figure 4, or a magnet 25, as shown in Figure 5. The cup 24 and the magnet 25 are attached to the rear face of the pillow 10, by any appropriate means, in such position as to readily engage the upright surface of the instrument panel 11, or other supporting surface, when the pillow 10 is placed in face-to-face relation with that surface.

The pad of the present invention will normally be carried in its pendant position against the upright surface of the instrument panel 11, as shown in Figure 1, and in that position will be readily available to the occupant of the right front seat of the vehicle. At the same time, it may readily be swung upwardly to permit access to the glove compartment of the instrument panel. In the event the occupant of the seat, equipped with one of the pads of the present invention, sees a crash impending, he seizes the straps 14, quickly pulls the pillow 10 around his head and buries his head in the portion of the pillow 10 between the straps 14, and braces himself between the seat 12 and the instrument panel 11. If a crash takes place, the user of the pad enjoys the full benefit of the resilience of the pillow 10 in protecting his head and hands from injury through impact with the windshield or the instrument panel upon the abrupt halting of the vehicle. The motions which the occupant of the seat goes through in seizing the pillow 10 and bringing it about his head correspond closely to those which a normal person instinctively follows when suddenly faced with the prospect of an accident of this type. Moreover, the movability of the crash pad pillow 10 enables the occupant of the vehicle to hold it in a position best calculated to guard him from injury considering the direction of approach and the character of the impending danger. The pad, thus, may well serve to protect the vehicle occupant even though he is thrown clear of the vehicle in the course of an accident. The pad is easily detached from the vehicle whenever its use is considered unnecessary or when the vehicle is traded in and may as easily be connected to another vehicle. Although the description and drawings deal largely with the connection of the pad of the present invention to the instrument panel of a vehicle for use by the occupant of the right front seat, pads of the identical construction may be attached to the back of the front seat so as to be in corresponding positions of availability for occupants of the back seat of the vehicle.

What is claimed is:

1. In combination, an automobile body having an instrument panel having a vertical surface, a resilient pillow having an upper edge, and suspending means secured to the upper edge of the pillow and to said body above said vertical surface and suspending said pillow in free contact with said vertical surface, said pillow being otherwise unsecured to the body, and spaced hand gripping means secured to the side of the pillow remote from said vertical surface for pulling the pillow away from said vertical surface, the spacing between the hand gripping means being of a width to receive the head of an individual therebetween.

2. In combination, an automobile body having an instrument panel having a vertical suface, a resilient pillow having an upper edge, and suspending means secured to the upper edge of the pillow and to said body above said vertical surface and suspending said pillow in free contact with said vertical surface, said pillow being otherwise unsecured to the body, and strap means secured to the side of the pillow remote from said vertical surface for pulling the pillow away from said vertical surface, said strap means comprising a pair of vertical straps secured only at their ends to said remote side of the pillow, said vertical straps being in laterally spaced relation to each other at a distance sufficient to permit a human head to engage said remote side of the pillow between the straps.

References Cited in the file of this patent

UNITED STATES PATENTS

| | | |
|---|---|---|
| 1,721,571 | Miller | July 23, 1929 |
| 1,895,197 | Martinson | Jan. 24, 1933 |
| 2,070,760 | Straight | Feb. 16, 1937 |
| 2,461,880 | Curran | Feb. 15, 1949 |
| 2,619,362 | Low | Nov. 25, 1952 |
| 2,663,020 | Cushman | Dec. 22, 1953 |

FOREIGN PATENTS

| | | |
|---|---|---|
| 769,903 | France | June 18, 1934 |
| 897,053 | Germany | Nov. 16, 1953 |
| 23,100 | Great Britain | Jan. 8, 1898 |